April 14, 1942.    S. M. NAMPA    2,280,047
GEAR SHIFTING MECHANISM
Filed Jan. 7, 1939
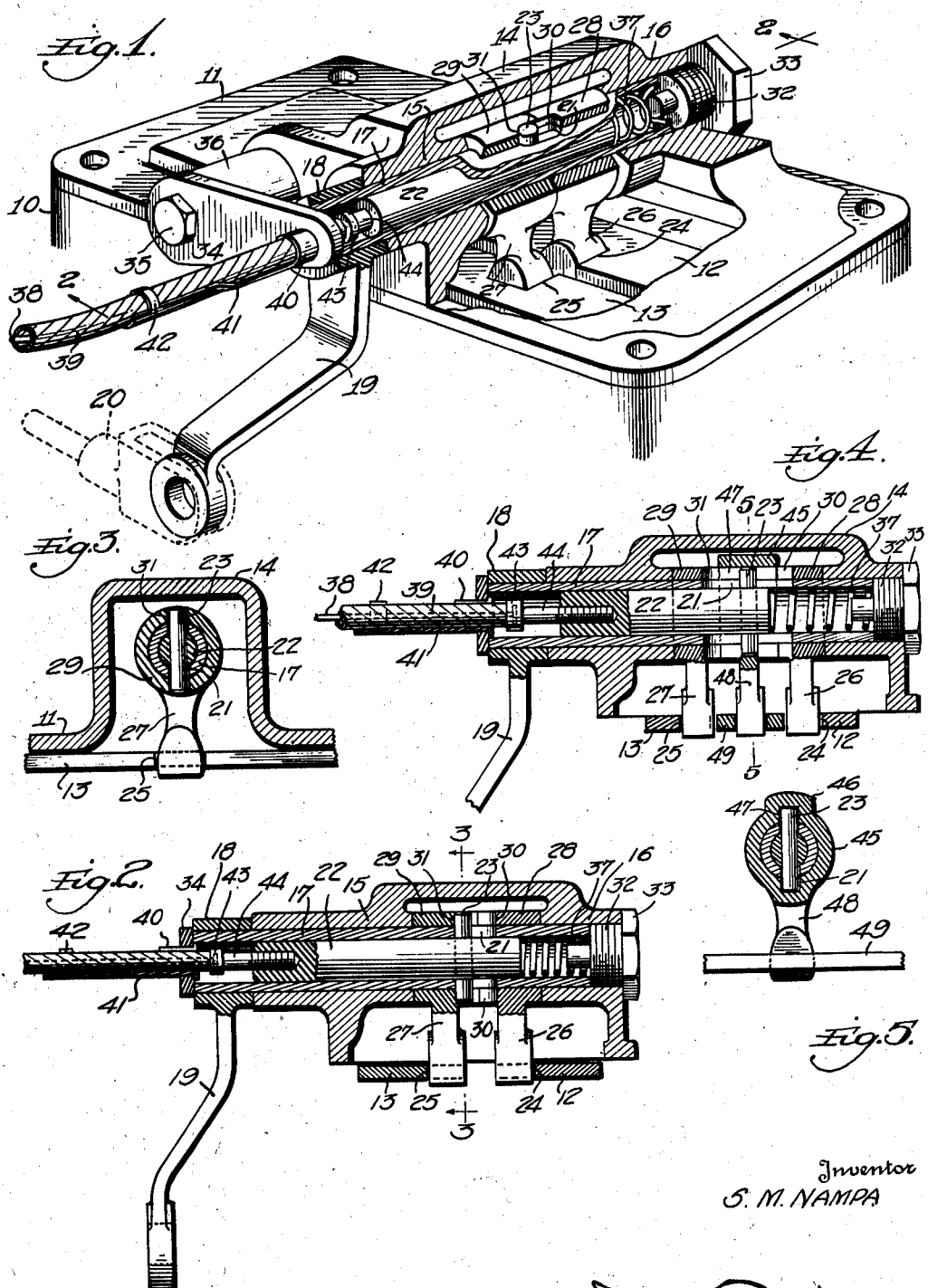
Inventor
S. M. NAMPA Patented Apr. 14, 1942

2,280,047

UNITED STATES PATENT OFFICE 2,280,047

GEAR SHIFTING MECHANISM

Sulo Michael Nampa, Detroit, Mich., assignor to Automatic Shifters, Inc., Richmond, Va., a corporation of Virginia Application January 7, 1939, Serial No. 249,806

16 Claims. (Cl. 74—473)

This invention relates to gear shifting mechanisms, and more particularly to a mechanism for operating the shiftable members of a motor vehicle transmission for changing the gear ratios.

In the development of power operated gear shifting mechanism it has been found desirable to provide manually operable means for selecting the shiftable members for operation, thus requiring the use of only one motor which is employed for effecting the shifting operation after the selecting operation has been completed. The provision of manually operable selecting means has involved difficulties in various ways. For example, if the same element which effects the shifting operations is moved laterally of the transmission to effect the selecting operations, difficulties are involved because of the weight of the parts which must be shifted in the selecting operation and the resistance offered in the moving of such parts. To avoid this difficulty, mechanisms have been developed for effecting the selecting operations wholly independently of the means for effecting the shifting operations, and while such mechanisms have been wholly practicable and operative, they have been relatively expensive.

Moreover, the elements to be shifted have been provided with notches which must be arranged in registering relationship in the neutral position of the parts to permit selection to take place between the shiftable members. With prior constructions, it has been necessary to work rather closely to dimensions to reduce lost motion as much as possible so as to accurately align the notches in the neutral position of the parts.

An important object of the present invention is to provide novel shifting mechanism, particular for motor vehicle transmissions, wherein the selecting operation may be accomplished against relatively small resistance, thus permitting the selecting operation to be manually performed, and to provide such a mechanism wherein the shifting operation is adapted to be accomplished by a suitable power source.

A further object is to provide a mechanism of this character wherein the selecting and shifting means are mounted as a unit with respect to the transmission, thus simplifying the mechanism as a whole.

A further object is to provide a member mounted to rock to perform the shifting operations, and to provide novel manually operable means for connecting the rocking member to either of a plurality of elements to be moved to effect the shifting operations.

A further object is to provide a mechanism of this character wherein the rocking member has associated therewith a selecting device which is axially movable to connect the rocking member to either of a plurality of elements to transmit rocking movement of the rocking member thereto to effect the desired shifting operation.

A further object is to provide a selecting and shifting mechanism wherein a simple form of positive clutch is provided for engagement with either of a plurality of elements to be operated to effect the shifting operation, and wherein the characteristics of the mechanism are such as to readily adapt it for use with transmissions having two or more shiftable members.

A further object is to provide a selecting and shifting mechanism wherein the slots in the shiftable members may be provided with some lost motion with respect to the elements engageable therein to render the mechanism somewhat cheaper to manufacture, and wherein the selecting mechanism provides self-aligning means operable when a selection is made between the different shiftable members to permit a selecting operation to take place even if the notches or slots in the shiftable members are not exactly in alignment with each other.

Other objects and advantages of the invention will become apparent during the course of the following description.

In the drawing I have shown two embodiments of the invention. In this showing

Figure 1 is a perspective of a portion of a transmission showing the invention applied, parts being broken away and parts being shown in section, Figure 2 is a vertical sectional view taken substantially on line 2—2 of Figure 1, Figure 3 is a transverse sectional view on line 3—3 of Figure 2, Figure 4 is a sectional view similar to Figure 2 showing a modified form of the invention, and Figure 5 is a sectional view on line 5—5 of Figure 4.

Referring to Figure 1 the numeral 10 designates a transmission as a whole provided with a cover plate 11 secured thereto in the usual manner. The transmission contains the usual change speed gearing (not shown) which may be of any type, and in the present instance the transmission has been shown as being provided with shift rails 12 and 13 longitudinally movable to provide different gear ratios. For example, the rail 12 may be moved in opposite directions from the neutral position shown in Figure 1 to provide first and reverse gears, while the shift rail 13 may be similarly moved to provide second or high gears.

The cover plate is provided with a central raised portion 14 extending transversely thereof and forming a housing having bearings 15 and 16 in opposite ends thereof. A tubular rocking member 17 is mounted in the bearings 15 and 16, the member 17 being adapted to rock in the bearings referred to but being fixed against axial movement in a manner to be described. The end of the tubular member 17 is provided adjacent the bearing 15 with the hub 18 of an operating crank 19. The free end of this crank may be actuated in any suitable manner, either manually or by a power source, a link 20, shown in dotted lines in Figure 1, being connected to the crank to effect actuation thereof. The tubular member 17 is provided with diametrically opposite longitudinal slots 21 for a purpose to be described.

An axially slidable selector member 22 is arranged within the tubular member 17 and is provided with a pin 23, preferably driven diametrically therethrough and extending on opposite sides therefrom. The projecting ends of the pin 23 are longitudinally slidable in the slots 21 and project therebeyond for a purpose to be described. It will be apparent that this arrangement permits the selecting member 22 to move axially with respect to the tubular member 17, but upon rocking movement of the latter, the engagement of the sides of the slots 21 with the projecting ends of the pin 23 will correspondingly rock the selecting member 22.

The shift rails 12 and 13 are respectively provided with notches 24 and 25 engaged by the lower ends of fingers 26 and 27, as shown in Figures 1 and 2. The shift fingers 26 and 27 are carried respectively by collars 28 and 29 rotatable on the tubular member 17. It will be apparent that the adjacent ends of the collars 28 and 29 are arranged in continuous relation while the remote ends of these collars engage the inner ends of the bearings 15 and 16. It will be apparent, therefore, that the collars 28 and 29 are fixed against longitudinal movement with respect to the tubular member 17.

The collars 28 and 29 are respectively provided in their adjacent edges with notches 30 and 31 to selectively receive the ends of the pin 23. When the parts are in the neutral position shown in Figure 1, the notches 30 and 31 are in registration with each other, and if they are slightly out of alignment, the movement of the pin 23 from one notch to the other will effect alignment of the notches, as will become apparent.

A plug 32 is threaded in the outer end of the bearing 16 and is provided with a head 33 arranged in proximity to the adjacent end of the tubular member 17 to limit movement of the member 17 in one direction. An arm 34 is secured as at 35 to a projection 36, preferably formed integral with the cover plate 11. The free end of the arm 34 is arranged adjacent one end of the tubular member 17 to limit movement thereof in the other direction. It will be apparent that the selecting member 22 may be freely slidable to engage the ends of the pin 23 in either pair of notches 30 or 31, but in some instances it is preferred that the pin 23 be biased for movement into one pair of notches. For example, as shown in Figures 1 and 2, a spring 37 may be arranged between the plug 32 and the adjacent end of the selecting member 22 to urge the latter toward the left as viewed in Figures 1 and 3 to engage the pin 23 in the notches 31, the member 22 being movable against the tension of the spring 37 to engage the pin 23 in the notches 30.

A Bowden wire 38 is slidable in a flexible housing 39. The housing 39 has its end arranged in a split ring 40, projecting through the free end of the arm 34 and fixed thereto, the ring 40 being compressed into clamping engagement with the housing 39. An integral spring extension 41 is preferably carried by the ring 40 and is provided at its free end with a similar split ring 42 clamped about the housing 39. The extension 41 forms a resilient support for the end of the housing 39 adjacent the transmission. The end of the Bowden wire has swivel connection as at 43 with a stem 44 threaded in the adjacent end of the selecting member 22.

The present invention is equally applicable to transmissions having four or more speeds wherein three or more shift rails or other shiftable members are employed. For example, in Figure 4 the mechanism is illustrated in connection with a transmission having three shift rails. In such a mechanism, the shift rails 12 and 13, the shift fingers 26 and 27 and the collars 28 and 29 have been shown separated to make room for an intermediate or third shift rail and its associated shifting device.

In Figure 4 all of the parts corresponding to the parts of the mechanism previously described have been indicated by the reference numerals employed in the foregoing description. As stated, the collars 28 and 29 are separated and an intermediate collar 45 is arranged therebetween. This collar is provided with diametrically opposite thickened portions 46 and 47, the interiors of which are milled out to provide grooves 47 extending longitudinally of the collar 45 and arranged in alignment with the notches 30 and 31 when the parts are in neutral position as shown in Figures 4 and 5. The collar 45 is provided with a depending finger 48 engaging the intermediate or third shift rail 49.

The operation of the form of the device shown in Figures 1, 2 and 3 is as follows:

As previously stated, the present device is particularly intended to permit manual selection of the shiftable elements of the transmission, and accordingly the Bowden wire 38 is preferably connected to a suitable handle (not shown) to be moved endwise and thus effect axial sliding movement of the selecting member 22. The rod 20 is preferably connected to a source of power which, if desired, may be controlled from the same handle which is employed for operating the Bowden wire 38. The particular means employed for actuating the Bowden wire and swinging the crank 19, however, form no part of the present invention per se and need not be referred to in detail.

Assuming that the biasing spring 37 is employed, the first and reverse gear shift rail 12 may be selected for operation by pushing endwise on the Bowden wire 38 to move the selecting member 22 to the right as viewed in Figures 1 and 3 against the tension of the spring 37, this spring being relatively light as will be apparent. Movement of the selecting member 22 in the manner referred to will slide the ends of the pin 23 through the slot 21 to be transferred from the notches 31 to the notches 30. Suitable means, of course, must be employed for holding the ends of the pin 23 against the tension of the spring 37 at least until the shifting operation has been started, as will become apparent.

With the ends of the pin 23 in the notches 30, force may be applied to the crank 19 to swing the latter and thus rock the tubular member 17, the direction of turning movement of this member depending upon whether the shift is to be made into first or reverse gears. Since the ends of the pin 23 project through the slots 21, it will be apparent that these pins will be turned about the axis of the tubular member 17 upon rocking movement of the latter, and the pin 23, being engaged in the notches 30, will effect turning movement of the collar 28 to cause the finger 26 to actuate the shift rail 12. As soon as the collar 28 has turned to a sufficient extent to move the notches 30 out of alignment with the notches 31, the endwise force applied to the selecting member 22 to hold it against the tension of the spring 37 may be released, the ends of the pin 23 being engageable against the adjacent end of the collar 29 and thus being prevented from moving out of the notches 30.

Assuming that a shift has been made into low gear and it is desired to shift into either second or high gear, the crank 19 will be rocked to turn the pin 23 and thus rock the collar 28 to move the shift rail 12 back to neutral position. When neutral position is reached, the spring 37 will effect axial sliding movement of the selecting member 22 to the left as viewed in Figure 1 to transfer the pin 23 from the notches 30 to the notches 31. If the spring 37 is not employed, it will be apparent that the same result will be accomplished by effecting a pull on the Bowden wire 38. By transmitting a force to the crank 19, the member 17 again may be rocked and the pin 23 will similarly rock the collar 29 whereupon the lower end of the finger 27 will effect sliding movement of the shift rail 13 into the desired gear position.

It will be apparent from the foregoing description that the selecting member 22 slides axially in the tubular member 17 to transfer the pin between the notches 30 and 31, but the selecting member rocks with the tubular member 17 when the latter is turned to effect a shifting operation. The swivel connection 43 permits the selecting member to turn on its axis without twisting the Bowden wire 38.

In order to slightly reduce the cost of the manufacture of the apparatus, the lower ends of the fingers 26 and 27 may fit relatively loosely in the notches 24 and 25. The shift rails 12 and 13 are provided with the usual spring detents (not shown) to properly position the shift rails in neutral position. With appreciable lost motion present between the lower ends of the shift fingers and the respective notches of the shift rails, however, the notches 30 may not be in exact registration with the notches 31 when either shift rail is returned to its neutral position. However, the pin 23 renders the notches 30 and 31 self-aligning. If the notches are not directly in alignment, the movement of the selecting member 22 to select a different shift rail for operation will cause the pin 23 to be transferred from one pair of notches 30 or 31 to the other and the circular shape of the pin will act as a cam to effect alignment of the notches 30 and 31 to permit the pin 23 to be transferred therebetween.

In the form of the invention shown in Figures 4 and 5 the operation is similar to that described above. The notches 30 and 31 and the grooves 47 will lie in aligned relationship when the three shift rails are all in neutral position, and accordingly the pin 23 may be engaged either in the notches 30 or 31 as in the form of the invention previously described, or the ends of the pin may be positioned within the grooves 47. Under the latter condition, rocking movement of the tubular member 17 will effect rocking movement of the collar 45 to transmit movement to the third shift rail 49. In this form of the invention, of course, suitable means will be employed for holding the pin 23 in the position shown in Figure 4 against the tension of the spring 37. For example, the usual form of gear shift lever slot for the third shift rail will accomplish this result, although any other desirable means may be employed.

The present construction eliminates the use of the substantial force which would be required for moving one shift finger and its associated parts between two or more shift rails to select the latter for operation. The selecting member 22 is readily axially movable without transmitting movement to any of the other parts except the pin 23, and accordingly it requires relatively little force to slide the member 22. This member need not have a particularly snug fit within the tubular member 17 since the latter member acts through the pin 23 to effect each shifting operation. Thus there is little frictional resistance encountered in axially moving the selecting member 22.

As previously stated, manual selection and power shifting have been accomplished in some prior forms of shifting mechanism by providing wholly separate and independent selecting and shifting devices. Such mechanisms require a greater number of independent parts and accordingly are relatively expensive to manufacture. The present device requires only the use of the aligned integral bearings 16 and 17 for supporting all of the selecting and shift rail actuating parts of the mechanism, thus simplifying the construction of the cover plate.

The device is assembled with respect to the cover plate before the latter is placed in position on the transmission casing. With the cover plate inverted, the fingers 26 and 27 are supported with their collars 28 and 29 in axial alignment with the bearings 15 and 16, whereupon the sleeve 17, without the pin 23 therein, is inserted in position in the bearings. The selecting member 22 is then moved axially through the sleeve 17, whereupon the pin 23 may be driven in position between the fingers 26 and 27. The mode of assembly of the remaining elements of the device will be obvious.

It is to be understood that the forms of the invention illustrated and described are to be taken as preferred examples of the same, and that various changes in the shape, size and arrangement of parts may be resorted to without departing from the spirit of the invention or the scope of the subjoined claims.

I claim:

1. Gear shifting mechanism for a transmission having shiftable elements therein and a plurality of rockers respectively directly engaged therewith, comprising a rocking actuating member, each of said rockers having a collar rotatably surrounding said actuating member, and a selecting clutch device carried by said actuating member and movable independently thereof to connect said actuating member to either of said collars, said clutch device being movable as a unit with said actuating member whereby rocking movement of the latter will rock the selected collar and its corresponding rocker, said clutch device having a portion extending from the transmission for operation independently of said actuating member.

2. Gear shifting mechanism for a transmission having shiftable elements therein and a plurality of rockers respectively directly engaged therewith, comprising a rocking actuating member, each of said rockers having a collar rotatably surrounding said actuating member, and a selecting clutch device carried by said actuating member and movable parallel to the axis thereof to connect it to either of said collars, said clutch device being fixed against relative rocking movement with respect to said actuating device whereby rocking movement of said actuating device will effect rocking movement of the selected collar and its corresponding rocker, said clutch device having a portion extending from the transmission for operation independently of said actuating member.

3. Gear shifting mechanism for a transmission having shiftable elements therein and a plurality of rockers respectively directly engaged therewith, comprising a tubular actuating member supported for axial rocking movement and fixed against longitudinal movement, each of said rockers having a collar rotatably surrounding said actuating member, and a selecting clutch device carried by said actuating member and slidable longitudinally with respect thereto, said clutch device having a portion selectively engageable with either of said collars upon sliding movement of said clutch device, said clutch device being fixed against rocking movement with respect to said actuating member whereby rocking movement of the latter will transmit rocking movement to the collar with which said portion of said clutch device is engaged, said clutch device having a portion extending from the transmission for operation independently of said actuating member.

4. Gear shifting mechanism for a transmission having shiftable elements therein and a plurality of rockers respectively directly engaged therewith, comprising a tubular actuating member supported for axial rocking movement and fixed against longitudinal movement, each of said rockers having a collar rotatably surrounding said actuating member, said actuating member having an elongated longitudinal slot, and a selecting clutch device slidably mounted in said actuating device and having a pin projecting through said slot and movable therein upon sliding movement of said clutch device to engage said pin with either of said collars, said slot engaging said pin to prevent relative rocking movement between said clutch device and said actuating member whereby rocking movement of the latter will correspondingly rock the collar with which said pin is engaged, said clutch device having a portion extending from the transmission for operation independently of said actuating member.

5. Gear shifting mechanism for a transmission having shiftable means including a plurality of rockers, comprising a tubular actuating member mounted for rocking movement, each of said rockers having a collar rotatably surrounding said actuating member, said collars being at least three in number with the intermediate collar longitudinally grooved throughout its length and with the end collars longitudinally notched at their inner ends, said groove and said notches being in longitudinal alignment when said rockers are in neutral position, a clutch device mounted in said actuating member and provided with a radially projecting pin, said actuating device being provided with a longitudinal slot through which said pin projects for selective engagement with said groove or said notches upon axial sliding movement of said clutch device, said slot having its sides engageable with said pin to prevent rocking movement of said clutch device with respect to said actuating member whereby rocking movement of the latter will effect corresponding movement of the collar engaged by said pin, said clutch device having a portion extending from the transmission for operation independently of said actuating member.

6. Gear shifting mechanism for a transmission having shiftable elements therein and a plurality of rockers respectively directly engaged therewith, comprising a tubular actuating member arranged coaxially with the rocking axis of said rockers, a crank carried by one end of said actuating member, a selecting clutch device slidably mounted in said actuating member, said clutch device having a portion selectively engageable with said rockers upon sliding movement of said clutch device with respect to said actuating member, said clutch device being fixed against rocking movement with respect to said actuating member to effect rocking movement of the rocker with which said portion of said clutch device is in engagement when force is applied to said crank to rock said actuating member, and means projecting axially from one end of said actuating member for transmitting sliding movement to said clutch device wholly independently of said crank.

7. Gear shifting mechanism for a transmission having shiftable elements therein and a plurality of rockers respectively directly engaged therewith, comprising a tubular actuating member arranged coaxially with the rocking axis of said rockers, a crank carried by one end of said actuating member, a selecting clutch device axially slidable in said actuating member and provided with a radially projecting element, said actuating member having a longitudinally elongated slot through which said projecting element extends, said projecting element being selectively engageable with either of said rockers upon sliding movement of said clutch device, the sides of said slot being engageable with said projecting element to fix said clutch device against rocking movement with respect to said actuating member whereby rocking movement of the latter, when force is applied to said crank, will effect rocking movement of the rocker with which said projecting element is engaged, and means projecting axially from one end of said actuating member for effecting sliding movement of said clutch device wholly independently of said crank.

8. Gear shifting mechanism for a transmission having shiftable elements therein and rockers respectively directly engaged therewith and having adjacent aligned collars, comprising a rocking actuating member coaxial with said collars, and a selecting clutch device axially slidable with respect to said actuating member and provided with a radially projecting pin, said collars being provided with recesses approximately aligned when said rockers are in neutral position.

said pin being movable between said recesses upon axial movement of said clutch device and being formed to cam said recesses into alignment with each other when moved from one recess to another, said clutch device being fixed against rocking movement with respect to said actuating device whereby rocking movement of the latter will effect rocking movement of the collar engaged by said pin, said clutch device having a portion extending from the transmission for operation independently of said actuating member.

9. Gear shifting mechanism for a transmission having shiftable elements therein and rockers respectively directly engaged therewith and having axially aligned collars, comprising a rocking actuating member coaxial with and projecting through said collars to support the latter for rocking movement, and a selecting clutch device longitudinally slidable with respect to said actuating member and provided with a radially projecting pin, said collars having recesses extending longitudinally with respect to the axis thereof and approximately aligned when said rockers are in neutral position, said pin being movable between said notches upon sliding movement of said clutch device and being formed to cam an adjacent pair of recesses into alignment with each other when moved therebetween, said clutch device being fixed against rocking movement with respect to said actuating member whereby rocking movement of the latter will effect rocking movement of the collar engaged by said pin, said clutch device having a portion extending from the transmission for operation independently of said actuating member.

10. Gear shifting mechanism for a transmission having shiftable elements therein and rockers respectively directly engaged therewith and having axially aligned collars, comprising a tubular rocking actuating member arranged coaxial with said collars, and a selecting clutch device mounted in and slidable longitudinally with respect to said actuating member and provided with a radially extending pin, said collars having recesses extending longitudinally with respect to the axis thereof and approximately aligned when said rockers are in neutral position, said pin being movable into selective engagement with said notches upon sliding movement of said clutch device and being formed to cam two adjacent notches into alignment upon movement therebetween, said clutch device being fixed against rocking movement with respect to said actuating member whereby rocking movement of the latter will effect rocking movement of the collar engaged by said pin, said clutch device having a portion extending from the transmission for operation independently of said actuating member.

11. Gear shifting mechanism for a transmission having shiftable elements therein and rockers respectively directly engaged therewith and having axially aligned collars, comprising a tubular rocking actuating member axially aligned with and projecting through said collars to support them for rocking movement, said actuating member having a slot therethrough elongated longitudinally thereof, and a selecting clutch device arranged in and slidable axially of said actuating member and provided with a radial pin extending through said slot, said collars having recesses extending longitudinally of the axis thereof and substantially aligned when said rockers are in neutral position, said pin being selectively engageable with said recesses upon sliding movement of said clutch device and being formed to cam an adjacent pair of recesses into alignment with each other when moved therebetween, the sides of said slot engaging said pin to prevent rocking movement of said clutch device with respect to said actuating member whereby rocking movement of the latter will rock the collar engaged by said pin, said clutch device having a portion extending from the transmission for operation independently of said actuating member.

12. Gear shifting mechanism for a transmission having shiftable members therein movable to provide different gear ratios, comprising an actuating member, and a selecting clutch device for determining the connection of said actuating device to either of said shiftable members, said clutch device comprising an actuating element separate from and in direct constant engagement with each shiftable member, said clutch device further comprising a portion movable independently of said actuating member to connect it to either of said actuating elements, said portion of said clutch device and either of said actuating elements being movable as a unit with said actuating member to transmit movement from the latter to the selected shiftable member, said clutch device having a portion extending from the transmission for operation independently of said actuating member.

13. Gear shifting mechanism for a transmission having shiftable members therein movable to provide different gear ratios, comprising a rocking actuating member, and a selecting clutch device for determining the connection between said actuating member and said shiftable members, said clutch device comprising an actuating element in direct constant engagement with each shiftable member, said clutch device further comprising a portion movable independently of said actuating member to engage either of said actuating elements, said independently movable portion and the actuating element engaged thereby being constructed and arranged to be rocked as a unit with said actuating member to render rocking movement of the latter effective for moving the selected shiftable member, said clutch device having a portion extending from the transmission for operation independently of said actuating member.

14. Gear shifting mechanism for a transmission having shiftable members therein movable to provide different gear ratios, comprising a rocking actuating member, and a selecting clutch device bodily carried by said actuating member for determining the connection of said actuating member to said shiftable members, said clutch device comprising an actuating element in direct constant engagement with each shiftable member, said clutch device further comprising a portion axially slidable with respect to said actuating member to engage either of said actuating elements, said portion of said clutch device being fixed against relative rotation with respect to said actuating member whereby said actuating member, said axially slidable portion and the actuating element engaged thereby rock as a unit to effect movement of the selected shiftable member, said clutch device having a portion extending from the transmission for operation independently of said actuating member.

15. A gear shifting mechanism for a transmission having shiftable members therein movable to provide different gear ratios, comprising a tubular actuating member fixed against axial movement, a plurality of collars relatively rotatably mounted on said actuating member and each having a depending element in direct constant engagement with one of said shiftable members, said collars having notches in their adjacent ends, a stem axially slidable in said actuating member, and a pin carried by said stem and projecting therebeyond at diametrically opposite points for selective engagement with said notches, said actuating member having diametrically opposite axially elongated slots through which the ends of said pin project for engagement in said notches.

16. A gear shifting mechanism for a transmission having shiftable members therein movable to provide different gear ratios, comprising a tubular actuating member fixed against axial movement, a plurality of collars relatively rotatably mounted on said actuating member and each having a depending element in direct constant engagement with one of said shiftable members, said collars having notches in their adjacent ends, a stem axially slidable in said actuating member, a pin carried by said stem and projecting therebeyond at diametrically opposite points for selective engagement with said notches, said actuating member having diametrically opposite axially elongated slots through which the ends of said pin project for engagement in said notches, a crank connected to said actuating member to effect rocking movement thereof, and means for effecting axial sliding movement of said stem wholly independently of said crank.

SULO MICHAEL NAMPA.